United States Patent [19]

Hall et al.

[11] Patent Number: 4,751,066

[45] Date of Patent: Jun. 14, 1988

[54] PROCESS FOR PREPARING ALKALI METAL PHOSPHATE

[75] Inventors: Richard E. Hall, Trenton; David P. Brochu, Hackettstown, both of N.J.

[73] Assignee: FMC Corporation, Philadelphia, Pa.

[21] Appl. No.: 860,963

[22] Filed: May 8, 1986

[51] Int. Cl.$^4$ .......................................... C01B 25/163
[52] U.S. Cl. ..................... 423/313; 423/181; 423/202; 423/208; 423/321 S
[58] Field of Search ............... 423/179, 208, 202, 309, 423/313, 312, 321 S, 181, 321 R

[56] References Cited

U.S. PATENT DOCUMENTS

| | | | |
|---|---|---|---|
| 1,929,443 | 10/1933 | Milligran | 23/107 |
| 3,391,990 | 7/1968 | Shen | 423/208 |
| 3,410,656 | 11/1968 | Bunin et al. | 23/165 |
| 3,466,141 | 9/1969 | Moldovan et al. | 423/202 |
| 3,635,669 | 1/1972 | Rubin | 423/208 |
| 3,767,769 | 10/1973 | Winand et al. | 423/309 |
| 3,872,215 | 7/1975 | Cherdron et al. | 423/309 |
| 3,993,733 | 11/1976 | Irani | 423/313 |
| 4,112,118 | 9/1978 | Cussons et al. | 423/309 |
| 4,117,092 | 9/1978 | Beltz et al. | 423/321 |
| 4,127,640 | 11/1978 | Williams | 423/309 |
| 4,132,540 | 1/1979 | Edwards et al. | 71/34 |
| 4,196,180 | 4/1980 | Wojtech et al. | 423/321 |
| 4,200,620 | 4/1980 | Ehlers et al. | 423/321 |
| 4,224,294 | 9/1980 | Powers | 423/309 |
| 4,256,716 | 3/1981 | Sikdar | 423/321 R |
| 4,291,007 | 9/1981 | Baniel | 423/321 S |
| 4,299,803 | 11/1981 | Schrodter et al. | 423/313 |
| 4,311,681 | 1/1982 | Chiang et al. | 423/321 S |
| 4,394,361 | 7/1983 | Berkowitz et al. | 423/321 S |
| 4,556,548 | 12/1985 | Gradi et al. | 423/313 |
| 4,596,703 | 6/1986 | Gradi et al. | 423/313 |

Primary Examiner—A. McFarlane
Attorney, Agent, or Firm—Robert D. Jackson; Frank Ianno

[57] ABSTRACT

Alkali metal phosphates are recovered from a water immiscible solvent solution of aqueous wet process phosphoric acid by neutralizing the acid with a basic alkali metal salt in a ratio of alkali metal to phosphorus of 1 to 3.5 to form at least the mono alkali metal phosphate. The solvent is given a water wash to recover entrained alkali metal phosphates. The resulting aqueous solution aforesaid and wash liquor containing the alkali metal salts are separated from the stripped solvent.

12 Claims, 1 Drawing Sheet

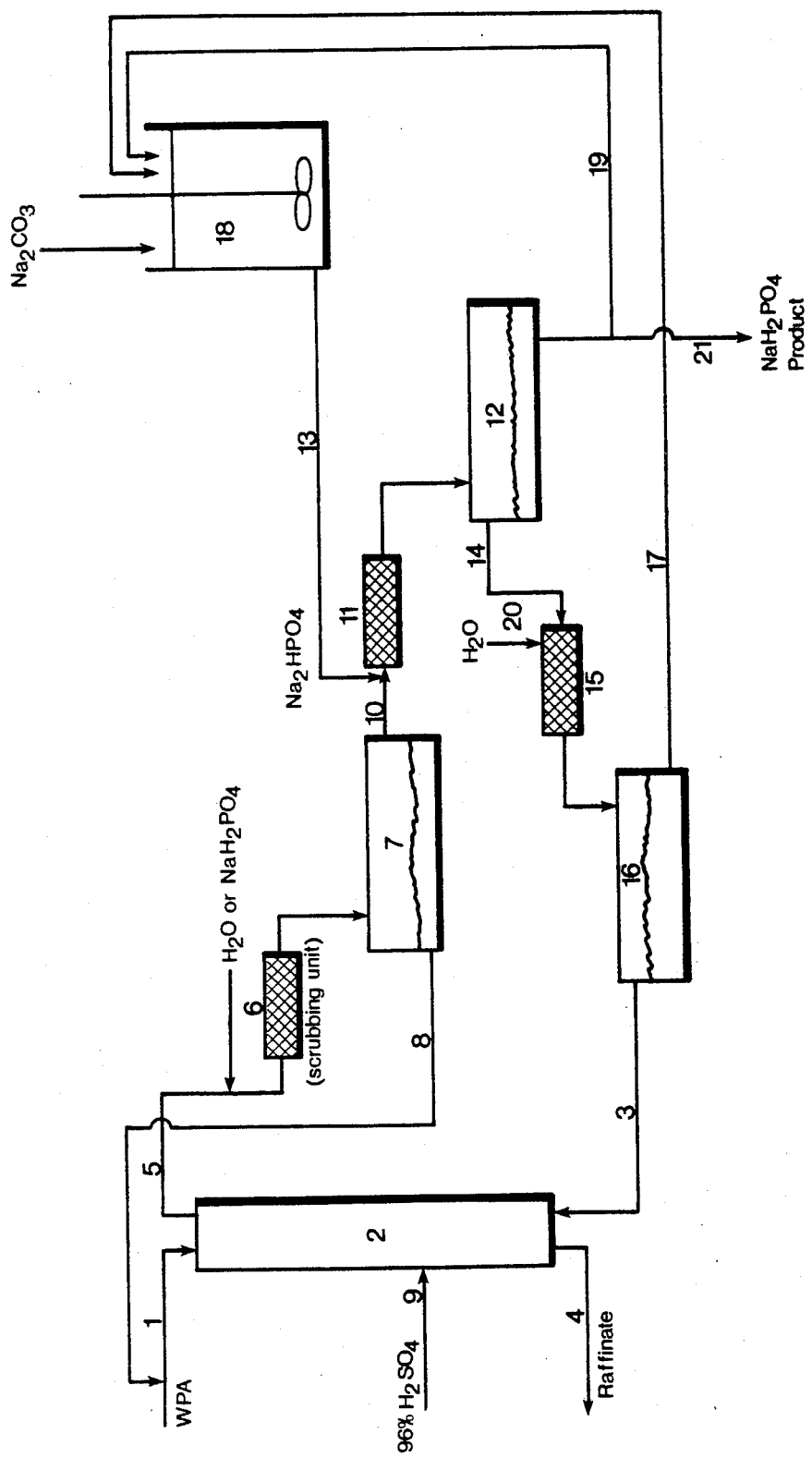

PROCESS FOR PREPARING ALKALI METAL PHOSPHATE

This invention relates to the preparation of alkali metal phosphates and in particular to the preparation of said metal phosphates from crude wet process phosphoric acid.

In the production of phosphoric acid by the so-called wet process, ground phosphate rock is acidulated with sulfuric acid to liberate the phosphoric acid which is then separated from by-product gypsum and other insolubles. The recovered crude phosphoric acid, commonly called green acid, may be suitable as such or it may require upgrading, depending on the type of use. Generally speaking, the crude acid is satisfactory when destined for the manufacture of ammonium phosphate fertilizers. In many cases, however, the green acid must be freed of impurities before it can be used. For instance, a purified form of the acid is required by the food and detergent industries. The impurities normally found in green acid are compounds of silicon, fluorine, calcium, arsenic, iron, aluminum, chromium, vanadium and lead plus various other metals in trace amounts.

It is known in the art to purify green acid by extraction with an organic solvent. There is formed a two-phase system consisting of a solvent phase containing the phosphoric acid and an aqueous phase containing the impurities. The loaded solvent is extracted with water to give a solution of purified phosphoric acid which can be concentrated or otherwise adjusted to the desired $P_2O_5$ assay.

In actual practice, banks of countercurrent extractors are employed with provisions for recycling the stripped solvent and acid streams. Such multiple units are necessary in commercial operations since a certain amount of the acid remains in the aqueous phase, which must be subjected to further extractions for effective recovery of the purified phosphoric acid. The extraction of the phosphoric acid is determined by its distribution coefficient between the aqueous and solvent phases. Preferably, a solvent is selected in which the phosphoric acid is much more soluble than it is in the aqueous phase.

It is also known to strip solvent solutions of phosphoric acid with basic alkali metal salts whereby phosphate values are recovered in the form of alkali metal phosphates. Such a procedure is disclosed in U.S. Pat. No. 1,929,443. Although the patent states that both water miscible and water immiscible solvents can be used, the latter is preferred. However, no details are given on extracting the phosphates from the water immiscible liquids which are referred to as oxygenated hydrocarbons. In a latter issued U.S. Pat. No. 3,767,769, alkali metal basic salts are used for stripping phosphoric acid from tributylphosphate solvent. According to the patent specification, the ratio of alkali metal ion to phosphate ion must be maintained below one to prevent formation of emulsions and entrainment of phosphate in the solvent phase. Therefore, a series of countercurrent extraction stages were needed to extract the phosphoric acid from the tributyl phosphate. A large quantity of 40% monosodium phosphate solution was used in the stripping step in order to reduce the acid content of the stripped solvent to less than 1%. This necessitated an increase in the size of the countercurrent extraction column in the stripping. The large quantity of aqueous phase is required because the extraction of the phosphoric acid from the solvent back into the aqueous phase is controlled by the distribution coefficient of phosphoric acid between the two phases. That this is the case can be seen by reference to the patent drawing and the description pertaining thereto at column 4, lines 4–9. According to this passage, the pH of the monosodium phosphate leaving battery 2 is 2.5, clearly indicating the presence of free phosphoric acid in the aqueous phase. A stream of sodium carbonate solution is introduced via line 12 into the exiting stream of acidic monosodium phosphate in order to bring the Na/P ratio in correspondence to monosodium phosphate. In U.S. Pat. No. 4,112,118, a process is disclosed for recovering phosphoric acid from a water immiscible solvent by treating the loaded solvent with an inorganic base. Less than stoichiometric quantities of base are used to produce an aqueous solution of phosphoric acid and phosphate salts in which the ratio of cation to phosphorus is in the range of 0.1–0.5 to 1.0. Keeping the alkali metal to phosphorus ratio below 1 is said to avoid the formation of emulsions. However, these conditions make the extraction of the phosphoric acid from the solvent to the aqueous phase dependent on the distribution coefficient between these phases. The examples in the patent indicate that a single stage extraction was used for the stripping step. The phosphoric acid concentration is reported to be less than 1% in the stripped solvent. This was accomplished by stripping with large quantities of monosodium phosphate liquor. As a consequence, there is produced a very large recycle stream of the monosodium phosphate liquor from the stripping step which is partially neutralized and returned to the stripper. This requires the use of large size equipment in the stripping step. It is thus evident that the processes described in this patent and that in U.S. Pat. No. 3,767,769 require that considerable quantities of phosphoric acid be returned to the extraction stage.

It is, accordingly, an object of the invention to provide an improved method of recovering purified alkali metal phosphate from wet process phosphoric acid by the alkaline extraction of said acid from a solvent solution. More particularly, it is an object of the invention to provide such a method of extracting phosphoric acid from a solvent which does not depend on the distribution coefficient of the phosphoric acid between the aqueous and solvent phases.

The objects aforesaid can be realized by the steps of (1) mixing a water immiscible solvent solution of wet process phosphoric acid with a basic alkali metal salt in which the ratio of alkali metal to phosphorus is greater than 1; (2) continuing the mixing until the phosphate values have been transferred from the solvent to the aqueous medium, (3) discontinuing the mixing whereby there is formed a two-phase system consisting of A. aqueous alkali metal phosphate and B. solvent containing entrained alkali metal phosphate; (4) water extracting the entrained alkali metal phosphate from B. to form an aqueous extract of alkali metal phosphate and (5) recovering the aqueous alkali metal phosphates from (3) and (4).

The transfer of the phosphate values from the solvent to the aqueous medium occurs rapidly and completely since the alkali metal salts are insoluble in the organic solvent. In other words, the product phosphate concentration is controlled by the concentration of the alkali metal salt and not by the phosphoric acid distribution between the aqueous and solvent phases. The process of the invention thus does not require multiple extraction steps as is the case when phosphate values are present as the free acid.

Where the ratio of alkali metal ion to phosphorus is 1, the resulting alkali metal phosphate salt is recovered as the acid salt, that is, $MH_2PO_4$. Where the ratio is 3 or above, the tertiary metal phosphate is formed: $M_3PO_4$. Intermediate ratio results in mixed salts. A particularly useful blend of alkali metal phosphates is monosodium and disodium phosphates with a Na/P ratio of 1.67 to 1 which constitutes the orthophosphate feed liquor in the production of sodium tripolyphosphate, an important ingredient in detergents.

Although any alkali metal salt is believed to be suitable for practicing the invention, the alkali metal phosphates are preferred, the sodium phosphates being most preferred. These can be employed directly or generated on site by adding recovered acid phosphates to alkaline sodium salts such as sodium carbonate.

Prior to the treatment herein, the phosphoric acid loaded solvent may be given a preliminary extraction in the known manner with water or dilute monosodium phosphate to remove dissolved impurities. Typically, the aqueous wash liquor to loaded solvent volume ratio is from 1 to 20 to 1 to 60, normally about 1 to 40 aqueous wash.

The water immiscible organic solvents suitable for extraction of wet acid are well known entities in the art. They include various hydrocarbons, alcohols, ketones, ethers and esters as well as mixtures thereof. It has been found that the alkaline exraction process of the invention is highly effective where the wet acid solvent is a normally liquid trialkyl phosphate such as, the tributyl ester. An especially preferred solvent is a combination by weight of about 75% tributyl phosphate and about 25% kerosene.

Referring now to the drawing, which is a flow diagram of the herein process, wet process phosphoric acid is fed to the top of a multistage, agitated, countecurrent extraction column (2) by line 1. The stripped, water immiscible solvent, preferably tributyl phosphate is fed into the bottom of the column through line 3. Sulfuric acid may be fed to the column through line 9 is a high percentage of the phosphates in the wet process acid are to be recovered. There is a temperature gradient across the length of the column caused by the exothermic heat of dissolution of the phosphoric acid in the solvent. The column temperature varies from about 25° C. at the bottom to as much as 60° C. at the top. An aqueous raffinate stream leaves the bottom of the column through line 4. Solvent containing 10 to 20 weight percent phosphoric acid, preferably 15%, exits the extraction column by line 5.

The loaded solvent is washed to remove cationic and anionic impurities. Water or monosodium phosphate can be used as the washing agent in this step. This scrubbing step may be carried out in a countercurrent or cocurrent column, a mixer settler or a mixer and decanter. The flow sheet shows the use of an inline static mixer (6) followed by a decanter (7) operating at about 50° C. The aqueous wash liquor to loaded solvent volume ratio may be from 1 to 20 to 1 to 60 but 1 to 40 is preferred. The aqueous wash liquor from the bottom of the decanter is sent back to the extraction column by line 8. The washed loaded solvent exits the top of the decanter by line 10.

The phosphoric acid in the solvent must be extracted back into an aqueous phase to give a useful product. Extraction with water gives phosphoric acid but the concentration of this acid is determined by the concentration of the acid in the solvent and the distribution coefficient for phosphoric acid between the two phases. The use of an ammonium or alkali salt to neutralize the phosphoric acid to the monoalkali phosphate extracts all of the phosphoric acid as the phosphate salt. The concentration of the phosphate salt is only dependent on the concentration of the ammonium or alkali salt solution used for the neutralization. A mixer settler, a mixer and decanter or even a cocurrent or countercurrent column could be used for the stripping step. An inline static mixer (11) and decanter (12) is used in the flow sheet. A single stage mixer and decanter is all that is needed because this step is a rapid neutralization reaction and not an extraction. The loaded solvent enters the mixer through line 10 and is mixed with an alkali salt, in this case disodium phosphate, from line 13 at about 50° C.

The stripped solvent containing about 0.05 to 0.1 percent monosodium phosphate from the top of the decanter is pumped to a single stage extractor (15) through line 14. A mixer settler or mixer and decanter are the preferred equipment but a cocurrent or countercurrent column could be used. Water is also introduced by line 20 into the static mixer (15) to wash the entrained phosphate from the solvent. The volume ratio of solvent to water is in the range of 20 to 1 to 60 to 1 with 40 to 1 being preferred. The water washed and stripped solvent from the top of decanter (16) is returned to the extraction column by line 3. The aqueous phosphate solution from the bottom of the decanter is pumped to the alkali metal salt makeup area. The concentration of this alkali metal salt solution or slurry determines the concentration of the product phosphate salt. The sodium carbonate slurry can be used to neutralize the phosphoric acid in the loaded solvent or in this case it can be used to make disodium phosphate in reactor (18). The disodium phosphate is then used to neutralize the phosphoric acid in the loaded solvent. A 40 to 60 weight percent monosodium phosphate solution is the product out of the stripper by line 21.

The invention is illustrated by the following nonlimiting examples.

EXAMPLE 1

A 1 liter sample of tributyl phosphate containing 16.0% phosphoric acid was neutralized to a pH of 4.5 with a solution of ortho liquor. The ortho liquor solution contained 35 weight percent disodium phosphate, 15 weight percent monosodium phosphate and 50% water. The temperature was maintained at 50° C. The resulting mixture was allowed to settle for one hour and the phases were separated. A sample of the tributyl phosphate phase was titrated to the endpoints at the pH's of 4.5 and 9.0. The concentration of mono and disodium phosphates in the solvent were calculated and reported as 0.43% phosphoric acid. The solvent was allowed to settle for an additional 24 hours at 50° C. and reanalyzed for mono and disodium phosphate content. The difference in the phosphate content was considered to be the amount of entrainment and was reported as the percent of entrained phosphoric acid, 0.05%, as shown in the Table. The entrainment was also expressed as the percent of the phosphoric acid in the loaded solvent, 0.38%.

EXAMPLE 2

One liter sample of tributyl phosphate containing 14.9% phosphoric acid was neutralized to a pH of 4.5 with an 18% sodium carbonate solution. At pH 4.5 the sodium to phosphorus ratio should be 1 to 1. The temperature was maintained at 50° C. Samples of the solvent phase were analyzed after 1 and 24 hours for phosphate content as explained in Example 1. The percentage of phosphoric acid entrained was found to be 0.008 which is 0.54% of the acid originally in the solvent. The entrainment is about the same as in the above example where the stripping was done with disodium phosphate.

EXAMPLE 3

One liter sample of tributyl phosphate containing 15.8% phosphoric acid was stripped with ortho liquor as described in Example 1. After settling for 1 hour the solvent contained 0.37% phosphoric acid. This stripped solvent was washed with 1 volume of water for each 20 volumes of solvent. The temperature was maintained at 50° C. The phosphoric acid concentration in this washed solvent was measured after 1 and 24 hours of settling. The percentage of phosphate entrainment was the equivalent of only 0.022% phosphoric acid as compared to 0.05% and 0.08% for the unwashed solvent samples. Therefore, water washing of the stripped solvent reduced the amount of entrained phosphates by a factor of 2 to 3.

The examples are summarized in the Table.

TABLE

Examples of Entrainment During Alkaline Stripping of a Loaded Solvent

| Example No. | Loading % $H_3PO_4$ | Stripping Solution | Scrubbing Solution | After 1 Hr. % $H_3PO_4$ | After 24 Hrs. % $H_3PO_4$ | Entrainment % $H_3PO_4$ | Entrainment % of Loading |
|---|---|---|---|---|---|---|---|
| 1 | 16.0 | Ortho Liquor | None | 0.43 | 0.38 | 0.05 | 0.31 |
| 2 | 14.9 | $Na_2CO_3$ Slurry | None | 0.23 | 0.15 | 0.08 | 0.54 |
| 3 | 15.8 | Ortho Liquor | Water | 0.06 | 0.04 | 0.02 | 0.14 |

We claim:

1. A method for the alkaline stripping of wet process phosphoric acid from a water immiscible organic solvent comprising the steps:
   (a) forming a mixture of the solvent solution with a basic alkali metal salt in which the ratio of the alkali metal to phosphorus in the mixture is greater than 1 to about 3.0 whereby the phosphoric acid is neutralized to at least the monosodium phosphate salt,
   (b) settling the mixture from (a) whereby there is formed a two-phase system consisting of (1) an aqueous solution of the alkali metal phosphate, and (2) a stripped solvent layer containing entrained alkali metal phosphate,
   (c) extracting layer (2) with water to remove entrained alkali metal salt thereby giving an aqueous solution of the salt and salt free solvent, and
   (d) recovering the alkali metal phosphates.

2. The method of claim 1 wherein the water immiscible solvent is a normally liquid trialkyl phosphate.

3. The method of claim 2 wherein the trialkyl phosphate is tributyl phosphate.

4. The method of claim 1 wherein the water immiscible solvent is a mixture by weight of 75% tributyl phosphate and 25% kerosene.

5. The method of claim 1 wherein the basic alkali metal salt is disodium phosphate.

6. The method of claim 5 wherein sufficient disodium phosphate is added to provide orthophosphate feed liquor having a sodium to phosphorus ratio of 1.67.

7. The method of claim 5 wherein the disodium phosphate is produced by reacting the requisite amount of recovered monosodium phosphate with sodium carbonate.

8. A continuous method for producing alkali metal phosphates from wet process phosphoric acid comprising the steps:
   (a) contacting crude aqueous phosphoric acid with a solvent consisting of normally liquid trialkyl phosphate in the presence of sulfuric acid in at least one countercurrent flow extraction unit to form a solvent solution of phosphoric acid and an aqueous raffinate phase,
   (b) mixing the solvent solution of phosphoric acid from (a) with an aqueous basic alkali metal salt in which the ratio of alkali metal to phosphorus in the mixture is greater than 1,
   (c) continuing the mixing until the phosphate values have been transferred from the solvent to the aqueous medium,
   (d) settling the mixture from (c) whereby there is formed a two-phase system consisting of (1) an aqueous solution of the alkali metal phosphate, and (2) a stripped solvent layer containing entrained alkali metal phosphate,
   (e) extracting the solvent layer (d) with water to remove entrained alkali metal salt thereby giving an aqueous solution of the salt and salt free solvent,
   (f) recovering the alkali metal phosphates, and
   (g) recycling the stripped solvent to the extraction unit.

9. The method of claim 8 wherein the solvent solution of phosphoric acid is washed with water to remove impurities and the washings are recovered.

10. The method of claim 8 wherein the solvent is a mixture of about 75% by weight of tributyl phosphate and about 25% by weight kerosene.

11. The method of claim 8 wherein the basic alkali metal salt is disodium phosphate.

12. The method of claim 11 wherein the solvent is a mixture by weight of about 75% tributyl phosphate and about 25% kerosene.

* * * * *